Figure 1:
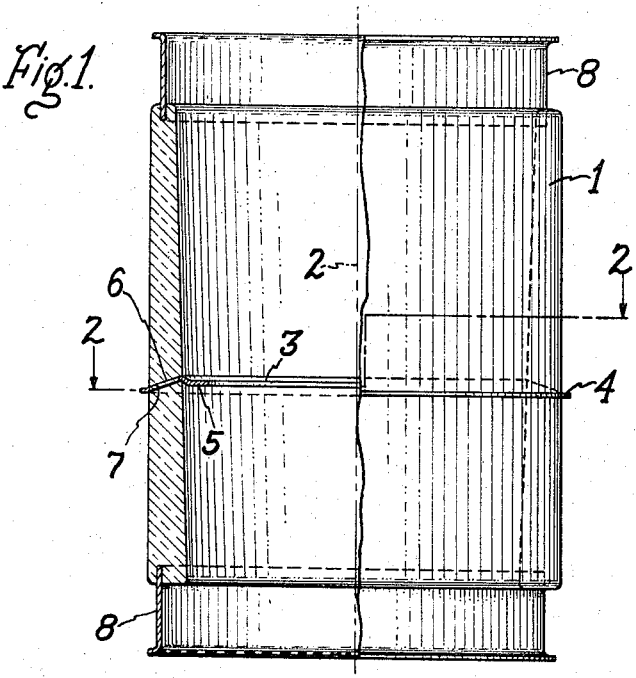

Inventors,
Paul A. Douillard,
Raymond W. Jones,
Richard A. Cunningham,
John R. Lucek,
by Gilbert P. Tarleton
Their Attorney.

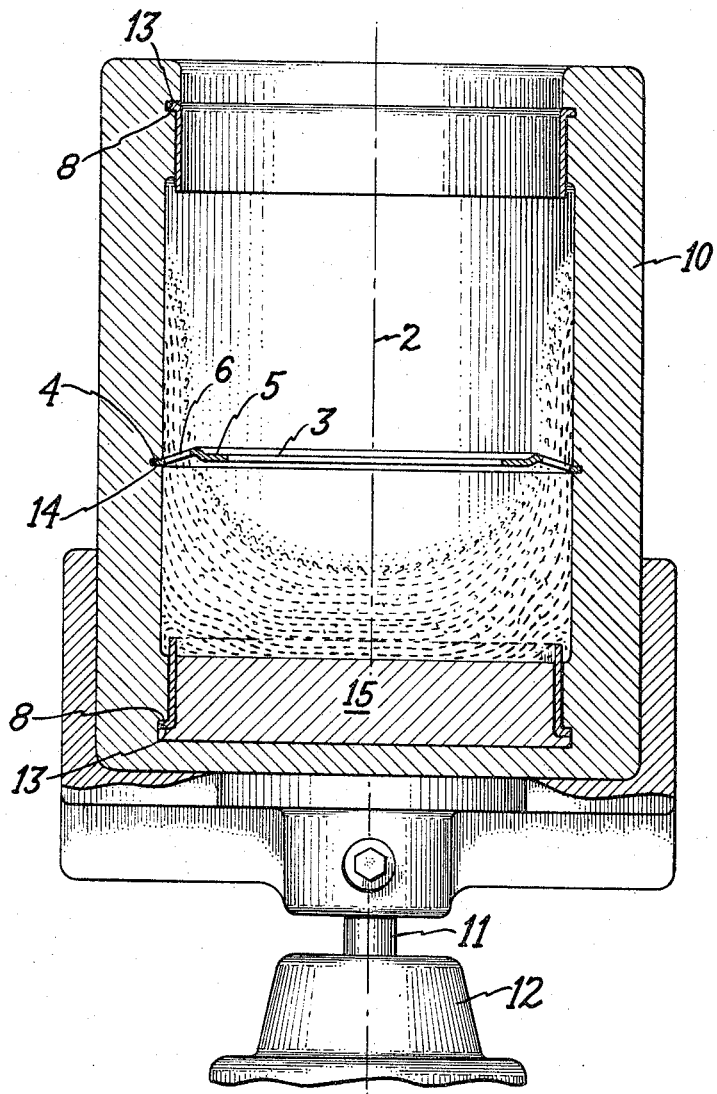

United States Patent Office 3,376,186
Patented Apr. 2, 1968

3,376,186
CENTRIFUGALLY CAST HOLLOW
GLASS BODY
Paul A. Douillard, Stockbridge, and Raymond W. Jones, Richard A. Cunningham, and John R. Lucek, Pittsfield, Mass., assignors to General Electric Company, a corporation of New York
Filed Aug. 7, 1962, Ser. No. 215,438
2 Claims. (Cl. 161—42)

This invention relates to centrifugally cast hollow glass bodies having embedded metal parts. More particularly the invention relates to cylindrical glass bodies used as evacuated envelopes for electrical devices such as electronic vacuum tubes and mechanically operated vacuum switches.

Occasionally it is desirable to embed in the walls of a cylindrical glass body and between its ends a radially extending metal supporting member. In an electrical device such support member may be used to mount a part inside said body, such as an electrode or vapor shield. One or more pins or the equivalent, passing through the walls of the glass body are one way to do this, but they are unsatisfactory for these applications for a number of reasons among which are the difficulty of obtaining proper alignment or orientation of the ends of a plurality of pins inside the body, the non-uniform stresses in the glass adjacent the pins and between the pins where high thermal gradients are involved, and the inherent requirement of many mold parts if many pins are used.

An object of the invention is to provide a new and improved cylindrical glass body and having embedded metal parts extending radially therethrough.

Another object of the invention is to provide a unitary hollow glass body which is bisected by a metal ring whose surface adjacent the inner and outer surfaces of the glass is continuous, but which has a series of perforations inside the glass which are filled with short columns of glass integrally joining the glass on both sides of the ring.

The invention will be better understood from the following description taken in connection with the accompanying drawing and its scope will be pointed out in the appended claims.

Figure 2:
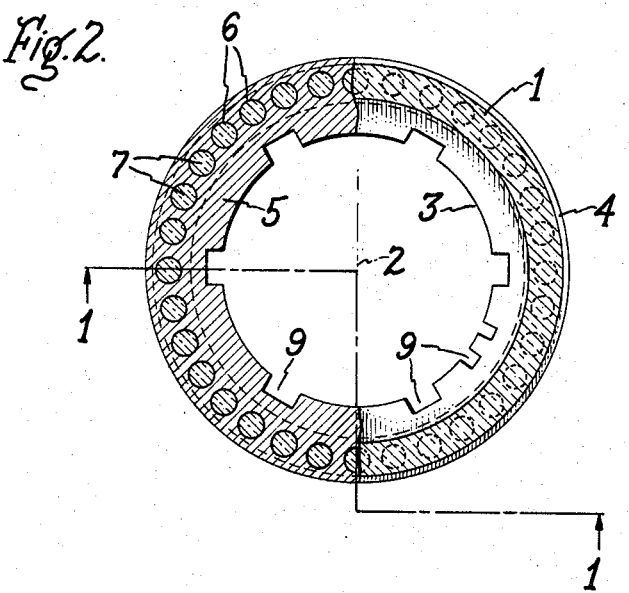

In the drawings,

FIGURE 1 is a front elevational view of the glass body, the left-hand half of which is shown in section on line 1—1 of FIG. 2, FIGURE 2 is another sectional view taken on line 2—2 of FIG. 1, and FIGURE 3 is an elevational view partly in section of an apparatus for making the article shown in FIGS. 1 and 2 by the preferred method of centrifugal casting.

Referring now to the drawings, FIGS. 1 and 2 show a hollow cylindrical glass body 1 which is circular in cross section about an axis 2. Bisecting the glass body 1 and coaxial with the cylinder axis is a metal ring 3 which extends entirely through the glass body and beyond at 4 on the outside and at 5 on the inside. The ring 3 is provided with a series of perforations 6 lying wholly within the confines of the wall of the glass body 1 extending generally parallel to the axis 2 and filled with relatively short glass homogeneous columns 7 which integrally join the portions of the glass body on opposite sides of the ring 3. The purpose of the ring 2 is to act as a support for a part mounted inside the glass body 1 such as an electrode of an electronic vacuum tube or a vapor shield for a mechanically movable contact type vacuum switch mounted inside the body 1.

The glass body 1 may also be provided with metallic so-called end flanges 8, embedded in the glass body at the ends, which are used for attachment of parts or mechanisms and for sealing the body so that it will hold a vacuum. As shown, notches 9 or other similar means may be provided in the portion of the ring 5 extending inwardly of the glass body for facilitating attachment and locking in place of internally mounted parts.

In order to obtain proper alignment or orientation of the inwardly extending portion 5 relative to the axis of symmetry and the notches 9 of the ring 3 with each other and with a part to be mounted thereon it is, of course, necessary that the ring 3 be accurately positioned and that it have a stable shape. By stable shape is meant that there will be very small tolerances or dimensional differences between different mass produced units or rings. However, it is necessary to make the ring 3, as well as the end flanges 8, of metal whose thermal expansion characteristics correspond closely to the thermal expansion characteristics of the glass. While this is no longer any problem in the art, such rings also have to be heat treated, and out-gassed, in order to make a good joint or seal with the glass and in order that very little gas is present in them to avoid reducing the vacuum in operation of the device and lowering the reliability of the components enclosed in the glass body. It has been found that when the metal ring is entirely flat to begin with that after such treatment it is considerably warped thus making it extremely difficult to mount a ring and obtain proper internal support clearances or alignment.

In accordance with another feature of the present invention, this difficulty is eliminated by making the perforated portion of the ring which is inside the glass proper of conical shape as is shown most clearly in the left-hand sectionalized part of FIG. 1. Due to this conical shape the inner part 5 and outer part 4 of the ring emerge from the glass wall in axially offset radial planes both of which are perpendicular to the axis 2. However, with such a conical construction it has been found that the parts 4 and 5 each remains flat even after extreme heat treatment and evacuation.

Another feature of the invention is that the surface of the ring as it enters or leaves the glass as the case may be is a continuous fused joint surface so that stresses set up in the glass are balanced due to the symmetry of the structure which is not the case when separate pins pass through the glass for mounting purposes.

While the structure shown in FIGS. 1 and 2 may be made in a number of different ways, such as by casting in a conventional mold or filling the perforations 6 with short glass columns and then placing separate glass cylinders above and below the ring and fusing all the parts together by heating, all of these ways are slow, costly, and objectionable compared to formation by centrifugal casting in accordance with our invention. While centrifugal casting of glass bodies such as hollow electrical insulating bushings is in itself old in the art, so far as is known no glass bodies have been previously centrifugally cast with a continuous or unitary metal member extending radially entirely through its wall because such a metal member would act as a barrier to the flow of molten glass up the walls of the spinning mold. In accordance with our invention, the perforations 6 in the ring 3 serve to permit the molten glass to rise up the sides of the mold, pass through the perforations 6, thereby to complete the upper part of the glass body 1 integrally with the lower part.

FIGURE 3 is an elevation view partly in section of an apparatus for forming the improved cast body of the present invention. As shown it comprises a mold 10 mounted for rotation about a vertical axis which corresponds to the axis 2 of FIGS. 1 and 2 and to an extension of the shaft 11 of an electric motor 12. The mold is a two-part mold which is divided along a plane passing through the axis, i.e. it is divided into equal halves. The mold halves are provided with registering grooves 13 for receiving the end flanges 8 and with intermediate registering grooves 14 for receiving and accurately pre-positioning the outer portion 4 of the ring 3. A block 15 of any suitable material, such as material corresponding to that of the mold 10, is inserted inside the lower end flange 8 for preventing its being filled with glass. A predetermined quantity of molten glass is then poured into the mold and the mold spun on its axis by the motor 12 causing the molten glass to flow outwardly and upwardly. The initial state of this motion being the formation of a meniscus on the surface of the glass, but as the speed of rotation is increased the center of the meniscus uncovers the inserted block 15, and then the glass continues to spread outwardly and upwardly along the walls of the mold 10 thus flowing through the perforations 6 in the ring 3 and on up and around the upper end flange 8 until the glass body assumes the shape shown in FIG. 1, at which point the speed of rotation is stabilized until the glass solidifies, after which the two-halves of the mold are separated and the glass body as shown in FIG. 1 is removed.

It is not always necessary that the perforations 6 lie wholly within the glass wall of the body and by reducing the amount of glass poured into the mold in order to reduce the wall thickness the inner edges of the perforations 6 may extend beyond the inner side of the glass wall.

While there have been shown and described particular embodiments of the invention, it will be obvious to those skilled in the art that changes and modifications may be made without departing from the invention, and therefore it is intended by the appended claims to cover all such changes and modifications as fall within the true spirit and scope of the invention.

What we claim as new and desire to secure by Letters Patent of the United States is:

1. In a centrifugally cast integral hollow glass body having a central axis and a circular cross section perpendicular to said axis, a unitary metal ring generally perpendicular to and centered on said axis, said ring having a series of perforations at spaced apart points around said axis, said glass body being centrifugally cast onto said ring with said ring embedded in said glass body between the ends thereof and extending completely through said body and beyond the inside and outside surfaces thereof, at least the major part of said perforations being within said body with the glass of said body extending homogeneously through said perforations and integrally joining the glass of said body on both sides of said ring, said ring being bonded to said glass to provide a hermetic seal at all points of contact, and said ring and said glass having substantially the same thermal expansion characteristics.

2. A centrifugally cast hollow glass body according to claim 1 wherein the portion of said ring which is embedded in said glass has a conical shape coaxial with the axis of said body, whereby the portions of said ring which extend radially inward and outward from said body emerge therefrom in axially offset radial planes perpendicular to the axis of said body.

References Cited

UNITED STATES PATENTS

| 2,560,593 | 7/1951 | Pask et al. | 161—196 |
| 3,001,900 | 9/1961 | Frieder et al. | 161—115 |
| 2,743,553 | 5/1956 | Armistead | 154—2.4 |
| 2,948,992 | 8/1960 | Oldfield et al. | 154—2.4 |
| 2,089,791 | 8/1937 | Hammel | 65—49 |
| 2,366,118 | 12/1944 | Luetzing | 65—71 |

FOREIGN PATENTS 561,001    7/1923    France.

ROBERT F. BURNETT, *Primary Examiner.*

EARL M. BERGERT, ALEXANDER WYMAN,
*Examiners.*

W. J. VAN BALEN, *Assistant Examiner.*